US012673298B1

(12) United States Patent
Bikson

(10) Patent No.: US 12,673,298 B1

(45) Date of Patent: Jul. 7, 2026

(54) FLUID SEPARATION MEMBRANES AND USE THEREOF

(71) Applicant: SEMICOM DWC-LLC, Dubai (AE)

(72) Inventor: Benjamin Bikson, Newton, MA (US)

(73) Assignee: SEMICOM DWC-LLC, Dubai (AE)

( * ) Notice: Subject to any disclaimer, the term of this patent is extended or adjusted under 35 U.S.C. 154(b) by 0 days.

(21) Appl. No.: 19/376,048

(22) Filed: Oct. 31, 2025

(51) Int. Cl.

| | |
|---|---|
| ***B01D 53/02*** | (2006.01) |
| ***B01D 53/22*** | (2006.01) |
| ***B01D 67/00*** | (2006.01) |
| ***B01D 69/02*** | (2006.01) |
| ***B01D 69/08*** | (2006.01) |
| ***B01D 69/12*** | (2006.01) |
| ***B01D 71/22*** | (2006.01) |
| ***B01D 71/64*** | (2006.01) |
| ***B01D 71/70*** | (2006.01) |
| ***C10L 3/10*** | (2006.01) |

(52) U.S. Cl.

CPC ......... *B01D 69/087* (2013.01); *B01D 53/228* (2013.01); *B01D 67/0011* (2013.01); *B01D 67/00135* (2022.08); *B01D 67/0016* (2013.01); *B01D 67/0083* (2013.01); *B01D 67/0095* (2013.01); *B01D 69/02* (2013.01); *B01D 69/12* (2013.01); *B01D 71/22* (2013.01); *B01D 71/643* (2022.08); *B01D 71/701* (2022.08); *C10L 3/104* (2013.01); *B01D 2256/10* (2013.01); *B01D 2256/16* (2013.01); *B01D 2256/18* (2013.01); *B01D 2256/245* (2013.01); *B01D 2257/104* (2013.01); *B01D 2257/504* (2013.01); *B01D 2323/10* (2013.01); *B01D 2323/12* (2013.01); *B01D 2323/219* (2022.08); *B01D 2325/022* (2013.01); *B01D 2325/24* (2013.01); *C10L 2290/548* (2013.01)

(58) Field of Classification Search

CPC ................ B01D 69/087; B01D 71/701; B01D 67/00135; B01D 71/643; B01D 53/228; B01D 67/0011; B01D 67/0016; B01D 67/0083; B01D 67/0095; B01D 69/02; B01D 69/12; B01D 71/22; C10L 3/104

See application file for complete search history.

(56) References Cited

U.S. PATENT DOCUMENTS

| | | | | | |
|---|---|---|---|---|---|
| 3,133,132 | A | | 5/1964 | Sidney et al. | |
| 4,230,463 | A | | 10/1980 | Henis et al. | |
| 4,673,418 | A | | 6/1987 | Peinemann | |
| 4,832,713 | A | | 5/1989 | Yamada et al. | |
| 4,871,494 | A | | 10/1989 | Kesting et al. | |
| 4,880,441 | A | | 11/1989 | Kesting et al. | |
| 4,881,954 | A | | 11/1989 | Bikson et al. | |
| 4,933,085 | A | | 6/1990 | Kneifel et al. | |
| 5,163,977 | A | * | 11/1992 | Jensvold | B01D 71/50 96/10 |
| 5,181,940 | A | * | 1/1993 | Bikson | B01D 53/22 264/177.17 |
| 5,443,728 | A | * | 8/1995 | Macheras | B01D 71/643 210/500.39 |
| 5,871,680 | A | * | 2/1999 | Macheras | D01D 5/24 264/211.13 |

OTHER PUBLICATIONS

Wikipedia Article on "Polyetherimide", Accessed Feb. 4, 2026 (Year: 2026).*

Albrecht, W., et al, "Preparation of highly asymmetric hollow fiber membranes from poly(ether imide) by a modified dry-wet phase inversion technique using a triple spinneret"; Journal of Membrane Science 262 (2005) 69-80.

Bakeri, Gh., at al, "Porous PES and PEI hollow fiber membranes in a gas-liquid contacting process—A comparative study"; Journal of Membrane Science 475 (2015) 57-64.

Barbari, T.A., "Polymeric Memebranes BAsed on Bisphenol-A for Gas Separations"; Journal of Membrane Science, 42 (1989) 69-86.

Barbari, T. A., "Gas Transport in Polymers Based on Bisphenol-A"; Journal of Polymer Science: Part B: Polymer Physics, vol. 26, 709-727 (1988).

Bos, A., et al, "Suppression of Gas Separation Membrane Plasticization by Homogeneous Polymer Blending"; AIChE Journal, May 2001, vol. 47, No. 5, 1088-1093.

Bos, A, et al, "Suppression of CO2-Plasticization by Semiinterpenetrating Polymer Network Formation"; Journal of Polymer Science: Part B: Polymer Physics, vol. 36, 1547-1556 (1998).

Bos, A., et al, "Plasticization-resistant glassy polyimide membranes for CO2/CO4 separations"; Separation and Purification Technology 14 (1998) 27-39.

Chen, X., et al, "A Comparison between Several Commercial Polymer Hollow Fiber Membranes for Gas Separation"; Journal of Membrane and Separation Technology, 2017, 6, 1-15.

Chung, T., et al, "Asymmetric hollow fiber membranes prepared from miscible polybenzimidazole and polyetherimide blends"; Journal of Membrane Science 147 (1998) 35-47.

Kneifel, K., "Preparation of hollow fiber membranes from polyetherimide for gas separation"; Journal of Membrane Science, 65 (1992) 295-307.

Kurdi, J., "The influence of casting solution structure on the microporosity of polyetherimide gas separation membranes prepared by the coagulation post-leaching method"; Journal of Membrane Science 184 (2001) 175-186.

Larocca, N.M., "Effect of antiplasticisation on the volumetric, gas sorption and transport properties of polyetherimide"; Journal of Membrane Science 218 (2003) 69-92.

Wang, D., at al, "Preparation and characterization of polyetherimide asymmetric hollow fiber membranes for gas separation"; Journal of Membrane Science 138 (1998) 193-201.

* cited by examiner

*Primary Examiner* — Christopher P Jones

(74) *Attorney, Agent, or Firm* — Forge IP, PLLC

(57) ABSTRACT

A process is disclosed for the production of highly asymmetric hollow fibers suitable for use as permselective gas separation membranes and for the fabrication of composite membranes derived from polyetherimide. The resulting polyetherimide membranes exhibit superior selectivity and permeability characteristics and are particularly advantageous for the separation of carbon dioxide from natural gas, biogas, and other gas streams containing acid gases.

22 Claims, No Drawings

FLUID SEPARATION MEMBRANES AND USE THEREOF

FIELD OF THE INVENTION

This invention relates to a novel method for preparing gas separation membranes and their use for removing acid gases from natural gas, biogas, and other gas streams containing acid gases.

BACKGROUND OF THE INVENTION

The present invention relates generally to hollow fiber membranes for gas separation applications and, more particularly, to glassy polymer membranes exhibiting improved resistance to plasticization during high-pressure separations of carbon dioxide ($CO_2$) and methane ($CH_4$) mixtures.

Glassy polymers are widely employed as membrane-forming materials for a variety of fluid separation processes, including gas separations. In industrial practice, there is an increasing demand for highly selective membranes derived from glassy polymers that are capable of maintaining their separation performance under elevated feed pressures, particularly in $CO_2/CH_4$ separations.

Polyimides have been recognized as promising materials for gas separation membranes due to their superior permselective properties compared to conventional glassy polymers such as cellulose acetate and polysulfone. However, in certain applications, these polymers exhibit significant sorption of one or more gas species, resulting in plasticization phenomena. Plasticization occurs when the polymer matrix swells upon sorption of a penetrant species, thereby increasing the segmental mobility of the polymer chains and enhancing the permeation rate of other gases. This leads to a reduction in membrane selectivity.

In $CO_2/CH_4$ separations, $CO_2$ acts as a plasticizing agent. $CO_2$-induced plasticization can significantly deteriorate membrane selectivity during high-pressure $CO_2/CH_4$ separations. As $CO_2$ is sorbed into the polymer matrix, it causes swelling, which enhances $CH_4$ permeation and consequently reduces membrane selectivity. A characteristic manifestation of plasticization is the presence of a minimum in the permeability versus pressure curve, with the pressure corresponding to this minimum referred to as the plasticization pressure. For certain polyimides exhibiting high intrinsic gas separation performance, plasticization can occur at $CO_2$ partial pressures as low as approximately 8 to 10 bar. Such pressures are commonly encountered in natural gas upgrading operations, where total pressures may reach up to 138 bar and $CO_2$ concentrations typically range from 5 to 40 percent. Similarly, landfill gas, which is generally produced at atmospheric pressure and contains approximately 40 to 50 percent $CO_2$, is frequently compressed to pressures of up to 40 bar to improve process efficiency.

Accordingly, there exists a need for glassy polymer membranes that retain their selectivity and separation performance at high feed pressures by minimizing or suppressing the effects of plasticization.

Polyetherimide (PEI) is a commercial thermoplastic polymer known for its excellent thermal stability and mechanical strength, making it widely used in membrane fabrication. Although PEI exhibits low intrinsic gas permeability for most commercially relevant gases, it has demonstrated utility in gas separation membranes, particularly for helium and hydrogen recovery and purification. Like many other glassy polymers, PEI undergoes plasticization when exposed to high-pressure gas streams containing elevated concentrations of carbon dioxide. Under such conditions, the $CO_2$ permeance increases with rising $CO_2$ partial pressure, while the $CO_2/CH_4$ selectivity decreases markedly, resulting in commercially unattractive separation performance.

The mixed-gas permeation behavior of polyetherimide (PEI) in dense flat-sheet film form was investigated by T. A. Barbari et al. and reported in the *Journal of Membrane Science,* 42 (1989) 69-86, including studies on $CO_2/CH_4$ gas mixtures. The separation factor was observed to decrease with increasing $CO_2$ partial pressure in the feed gas. Exposure to high-pressure carbon dioxide is known to modify the transport properties of the polymer due to the conditioning or plasticization effect induced by $CO_2$.

The incorporation of specific low-molecular-weight additives can induce anti-plasticization effects in polymers, mitigating this behavior. To render membranes suitable for applications such as natural gas upgrading, plasticization must be minimized. A. Bos et al. demonstrated the use of anti-plasticization additives to enhance the gas separation performance of polyimide membranes, as reported in the *Journal of Polymer Science: Part B: Polymer Physics,* 36 (1998) 1547-1556.

The effects of low-molecular-weight additives on the gas sorption and transport properties of polyetherimide (PEI) were investigated by N. M. Larocca and L. A. Pessan, as reported in *Journal of Membrane Science,* 218 (2003) 69-92, "Effect of antiplasticization on the volumetric, gas sorption and transport properties of polyetherimide." The study found that while the addition of these additives produced an anti-plasticization effect, it also led to a significant reduction in gas permeability.

Commercial gas separation membranes generally exhibit two main morphological structures: asymmetric and composite. Asymmetric polymeric membranes are typically fabricated via phase inversion processes, such as the dry-wet casting method, using a polymer solution that contains a good solvent along with additives such as non-solvents or inorganic salts. These additives promote the formation of an asymmetric pore structure characterized by a thin, dense surface separation layer supported by a porous substructure that offers minimal resistance to gas transport. Porous polyetherimide (PEI) membranes with asymmetric structures are known to form from aprotic solvent systems containing a non-solvent.

The preparation of polyetherimide (PEI) membranes using water as a non-solvent has been described by Gh. Bakeri et al. in the *Journal of Membrane Science,* 475 (2015) 57-64 (doi: 10.1016/j.memsci.2014.09.037). However, this formulation does not yield membranes with satisfactory gas separation performance.

The fabrication of flat-sheet asymmetric PEI membranes via phase inversion using a halogenated hydrocarbon as a volatile solvent, along with various organic non-solvents as additives and coagulants, was disclosed by K.-V. Peinemann in U.S. Pat. No. 4,673,418, entitled "Method for Producing an Integral, Asymmetric Membrane and the Resultant Membrane." The preferred integral asymmetric membrane is obtained when the membrane-forming polymer is polyetherimide, the solvent is a halogenated hydrocarbon, and the swelling agent is selected from alkyl-substituted benzenes, aliphatic carboxylic acids, or chlorinated hydrocarbons. However, the solvent systems employed in this process are highly hazardous and, therefore, not suitable for commercial-scale deployment.

The preparation of integral asymmetric polyetherimide (PEI) hollow fiber membranes for gas separation using an N-methyl-2-pyrrolidone (NMP) solvent system with ethanol as a non-solvent was reported by D. Wang, K. Li, and W. K. Teo in the *Journal of Membrane Science,* 138 (1998) 193-201, titled "Preparation and Characterization of Polyetherimide Asymmetric Hollow Fiber Membranes for Gas Separation." The resulting hollow fiber membranes exhibited poor gas separation and permeation performance.

Polyimide-based gas separation membranes, including those derived from polyetherimide, have also been prepared from solutions containing salts as non-solvent additives, with the salts being soluble in the organic solvent. J. Kurdi and A. Y. Tremblay, in the *Journal of Membrane Science,* 184 (2001) 175-186, described the fabrication of PEI hollow fiber membranes from an NMP solvent system incorporating $LiNO_3$ as an additive. The pore structure of the resulting hollow fibers was analyzed as a function of salt complexation with the NMP solvent.

The preparation of integral asymmetric polyetherimide (PEI) hollow fiber membranes for gas separation using solvents such as N-methyl-2-pyrrolidone (NMP), dimethylacetamide (DMA), dimethylformamide (DMF), and the non-solvent γ-butyrolactone (GBL) was reported by K. Kneifel and K.-V. Peinemann in the *Journal of Membrane Science,* 65 (1992) 295-307, and further described by Kneifel et al. in U.S. Pat. No. 4,933,085. Membranes coated with silicone rubber exhibited favorable helium/nitrogen selectivity and oxygen permeance.

The fabrication of highly asymmetric PEI hollow fiber membranes using a modified dry-wet phase inversion technique with a triple spinneret was described by W. Albrecht et al. in the *Journal of Membrane Science,* 262 (2005) 69-80. The spinning dopes were prepared by dissolving PEI in solvent mixtures of NMP/γ-butyrolactone (GBL) or NMP/dimethyl sulfoxide (DMSO). Only nitrogen gas permeance was reported for these membranes, which were primarily intended for gas-liquid contactor applications rather than gas separation.

Asymmetric gas separation membranes featuring a graded-density skin were disclosed by R. E. Kesting et al. in U.S. Pat. No. 4,880,441. The patent also describes the preparation of hollow fiber gas separation membranes from polyetherimide (PEI) solutions containing a solvent and a non-solvent, wherein the non-solvent forms a complex with the solvent. Propionic acid was identified as the preferred non-solvent in this system.

In a related development, R. E. Kesting et al. disclosed a process for forming asymmetric gas separation membranes with graded-density skins in U.S. Pat. No. 4,871,494. In this method, hollow fibers are produced from solvent systems comprising a Lewis acid, a Lewis base, and their corresponding Lewis acid-base complex. Gas separation hollow fibers were fabricated from PEI solutions using formamide or propionic acid as the Lewis acid non-solvent.

The preparation of asymmetric flat-sheet poly(ether imide) (PEI) membranes for gas separation applications was disclosed by Katsuya Yamada and Koichi Okita in U.S. Pat. No. 4,832,713. Membranes are produced by casting polymer solutions composed of N-methyl-2-pyrrolidone (NMP) as the solvent and tetrahydrofuran (THF) as the non-solvent. The patent further describes coating the resulting membranes with silicone rubber to enhance their gas separation performance.

It is also known that gas separation membranes can be fabricated from blends of polyetherimide (PEI) with other polyimides to enhance mechanical strength and/or gas separation performance. In certain cases, such blending can suppress $CO_2$-induced plasticization. A. Bos et al. reported the stabilization of plasticization effects in mixed-gas streams for polymer blends of the polyimide Matrimid and polysulfone in the *AIChE Journal,* 47 (2001) 1088. The same study also described the transport properties of a new homogeneous polymer blend based on Matrimid and the copolyimide P84.

The preparation of asymmetric hollow fiber membranes from a miscible blend of polyetherimide (PEI) and polybenzimidazole (PBI) was reported by Tai-Shung Chung et al. in the *Journal of Membrane Science,* 147 (1998) 35-44. However, the reported gas separation performance of these membranes remained commercially unattractive, even after surface coating with silicone rubber.

A gas separation membrane comprising the blend of polyetherimide and phenylindane containing polyimide was reported by J. T. Machers et al., in the U.S. Pat. No. 5,443,728. The hollow fiber membranes were prepared from the polymer blend solution in N-methyl pyrrolidone with gamma-butyrolactone as a non-solvent.

The thin, selective skin of conventional asymmetric membranes, such as those described in Loeb U.S. Pat. No. 3,133,132, is generally not defect-free. These membranes typically contain imperfections in the form of residual pores, minute pinholes, or similar structural flaws. Such defects constitute relatively large openings through which the feed gas can preferentially pass, thereby bypassing the intended selective diffusion pathway. Consequently, the overall gas separation performance is significantly diminished, as a substantial portion of the feed gas permeates through these defects rather than interacting with the polymer material of the membrane itself.

In an effort to address this problem, J. Henis et al., in U.S. Pat. No. 4,230,463, disclosed the use of a coating material applied to an asymmetric membrane, wherein the coating material possesses an intrinsic separation factor lower than that of the base membrane material. The resulting composite, or multicomponent, membrane was found to exhibit a separation factor significantly greater than both the intrinsic separation factor of the coating material and the separation factor of the uncoated membrane.

By way of example, a silicone coating material, which has an $O_2/N_2$ selectivity of approximately 2, may be applied to polysulfone hollow fiber membranes containing surface defects. This treatment can increase the $O_2/N_2$ selectivity from the range of about 1-1.5 for the uncoated membrane to values ranging from about 2 to 6, with selectivity commonly approaching 6. This method of sealing or "caulking" surface defects in asymmetric hollow fiber membranes using an ultrathin separation layer has been widely adopted in commercial membrane fabrication.

To mitigate plasticization and reduce the loss of $CO_2/CH_4$ separation efficiency, the membrane can be subjected to thermal treatment. A. Bos et al. (Separation and Purification Technology, 14 (1998) 27-39) reported that thermal annealing suppresses the plasticization of polyimide membranes, although combined with a significant loss in permeance.

It is also known in the art to employ coating materials having high gas separation factors to further improve the selectivity of asymmetric hollow fiber membranes. For example, B. Bikson in U.S. Pat. No. 4,881,954 describes the application of such high-performance coating materials to enhance the gas separation characteristics of asymmetric membranes.

Preparation methods for hollow fiber gas separation membranes from polyetherimide polymers and blends thereof with compatible polyimides have been disclosed in the prior art. The prior art also describes the fabrication of multicomponent and composite gas separation membranes formed by coating asymmetric hollow fibers with rubbery or glassy materials. However, these known membranes typically suffer from a loss of selectivity when exposed to gases containing high concentrations of carbon dioxide or other plasticizing components.

Accordingly, there exists a continuing need for polyetherimide-based polymer membranes that maintain their selectivity and separation performance under high feed pressures by minimizing or suppressing the effects of plasticization.

It has now been unexpectedly discovered that hollow fiber membrane casting formulations containing specific non-solvent additives yield gas separation membranes exhibiting improved and stable separation performance, even when exposed to gas feeds containing plasticizing components such as carbon dioxide.

SUMMARY OF THE INVENTION

The present invention provides an improved method for the preparation of polyetherimide hollow fiber membranes and the use thereof in gas separation applications, including the removal of acid gases from feed gas streams containing high concentrations of carbon dioxide.

In one embodiment of the present invention, an asymmetric gas separation hollow fiber membrane comprising a polymer composition comprising polyetherimide (PEI) or a blend of polyetherimide and a compatible polyimide, wherein the weight ratio of polyetherimide to compatible polyimide is 5:1 or higher, is produced by a method comprising the steps of:

(i) forming a spinning solution comprising polyetherimide (PEI) or a blend of polyetherimide and a compatible polyimide dissolved in a mixture of an aprotic solvent and a glycol ether non-solvent;
(ii) extruding the spinning solution through a spinneret to form a nascent hollow fiber while simultaneously introducing a bore fluid into the lumen of the fiber;
(iii) passing the nascent hollow fiber through an air gap;
(iv) immersing the hollow fiber in a coagulation bath to complete the solidification of the fiber structure;
(v) washing the solidified hollow fiber to remove residual solvent and non-solvent; and
(vi) collecting the washed hollow fiber for subsequent drying or post-treatment steps.

The post-treatment steps may include drying the hollow fibers, applying a coating of a polymeric solution to the fiber surface, and optionally subjecting the coated or uncoated fibers to an annealing treatment.

Suitable coating materials include rubbery or glassy polymers that enhance the surface integrity and gas separation performance of the hollow fiber membrane. Exemplary coating materials include silicone-based polymers, poly(dimethylsiloxane) (PDMS), polyurethane, and other elastomeric or crosslinkable polymers capable of forming ultrathin, defect-sealing layers or glassy polymers such as cellulose acetate, ethyl cellulose, or sulfonated polyphenylene oxide. The coating may be applied from dilute polymeric solutions using techniques such as dip coating, followed by solvent evaporation to form a uniform coating layer.

The annealing step may be carried out under controlled temperature conditions sufficient to relax residual stress within the polymer matrix, improve interchain packing and enhance the overall mechanical and separation stability of the membrane. Annealing is typically conducted at a temperature below the glass transition temperature (Tg) of the polymer for a period sufficient to achieve the desired thermal conditioning without inducing deformation or pore collapse of the hollow fiber structure.

In another embodiment of the present invention, a process for separating carbon dioxide from a gas stream containing one or more additional gas components comprises contacting the gas stream with an asymmetric hollow fiber membrane formed from a polymer composition comprising polyetherimide (PEI) or a blend of polyetherimide and a compatible polyimide, wherein the weight ratio of polyetherimide to compatible polyimide is at least about 5:1, said membrane being prepared by a method comprising:

(i) preparing a spinning solution comprising polyetherimide or a blend of polyetherimide and a compatible polyimide dissolved in a mixture of an aprotic solvent and a glycol ether non-solvent;
(ii) extruding the spinning solution through a spinneret to form a nascent hollow fiber while simultaneously introducing a bore fluid into the lumen of the fiber;
(iii) passing the nascent hollow fiber through an air gap;
(iv) immersing the hollow fiber in a coagulation bath to solidify the fiber structure;
(v) washing the solidified hollow fiber to remove residual solvent and non-solvent; and
(vi) collecting the washed hollow fiber to obtain the asymmetric hollow fiber membrane;

wherein the asymmetric hollow fiber membrane selectively permeates carbon dioxide relative to at least said one additional component of the gas mixture, thereby producing a permeate stream enriched in carbon dioxide and a residue stream depleted in carbon dioxide.

Gas separation performance of the asymmetric polyetherimide hollow fiber membranes prepared in accordance with the present invention was evaluated using feed gas mixtures containing carbon dioxide, nitrogen, and methane. The membranes exhibited high permeability and selectivity for carbon dioxide over methane and nitrogen, demonstrating stable performance under elevated feed pressures and in the presence of carbon dioxide concentrations representative of natural gas and biogas streams.

In particular, membranes fabricated from polyetherimide or blends of polyetherimide with compatible polyimides at a weight ratio of 5:1 or higher exhibit carbon dioxide/methane selectivity values in mixed gas streams in the range of about 25 to 40, with corresponding carbon dioxide permeance exceeding $25\times10^{-6}$ $cm^3$ (STP)/$cm^2$·cmHg·sec under test conditions of 35° C. in feed gas mixture with carbon dioxide partial pressures as high as 30 bar. Importantly, no significant decline in selectivity was observed upon extended exposure to high-pressure gas streams containing carbon dioxide concentrations up to 50 percent by volume, indicating effective suppression of plasticization phenomena.

The observed stability and high separation performance of the membranes are attributed to the spinning formulation and hollow fiber processing conditions, which promote the formation of a favorable hollow fiber morphology. The resulting asymmetric structure, combined with optional coating and annealing post-treatments, yields a membrane having a dense, defect-free selective skin and a porous substructure optimized for gas transport and mechanical integrity.

The present invention is not limited to the separation of carbon dioxide from natural gas and biogas streams, but is also applicable to a wide range of gas separation processes, including the recovery of helium, the recovery and purification of hydrogen, the generation of nitrogen from air, and other demanding gas separation applications requiring membranes with high selectivity and stability under elevated pressure and mixed-gas conditions.

DETAILED DESCRIPTION OF THE PREFERRED EMBODIMENTS

The present invention relates to asymmetric gas separation hollow fibers formed from polyetherimide (PEI)-based polymers or from polymer blends comprising polyetherimide and compatible polyimides, wherein the weight ratio of polyetherimide to the compatible polyimide of 5:1 or higher, and in some embodiments 15:1 or higher.

Such compositions provide an advantageous balance of mechanical strength, thermal stability, and gas separation performance.

The polyetherimide (PEI)-based polymers include polyetherimide of the following formulae:

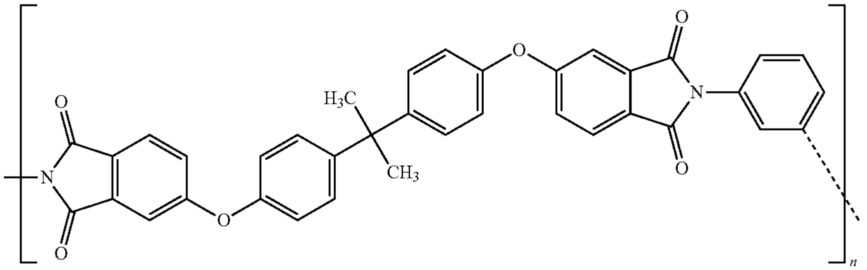

known under UPAC name benzene-1,3-diamine; 5-[4-[2-[4-[(1,3-dioxo-2-benzofuran-5-yl)oxy]phenyl]propan-2-yl] phenoxy]-2-benzofuran-1,3-dione, and polyetherimide derived by polycondensation of Bisphenol-A dianhydride (BPADA) and diamino diphenyl sulfone (DDS) of the following formulae:

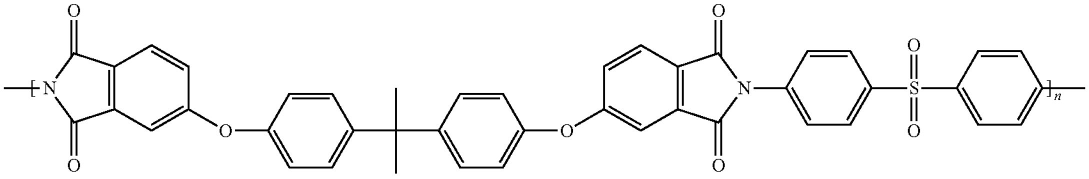

commercial polyetherimide plastics manufactured by SABIC Industries under the trade names ULTEM™ and EXTEM™, and other polyetherimide and polyetherimide copolymers such as Siltem™.

Compatible polyimides include, but are not limited to, Matrimid® 5218, a soluble, thermoplastic polyimide derived by polycondensation of 3,3',4,4'-benzophenone tetracarboxylic dianhydride (BTDA) and a diamine monomer, 5 (6)-amino-1-(4'-aminophenyl)-1,3,3-trimethylindane commercially available from Huntsman Corporation, and P84® polyimide, which is derived from aromatic dianhydrides and aromatic diisocyanates and is available from Evonik Corporation, or a mixture of these polyimides.

Hollow fibers are formed from polymer solutions by a dry-wet spinning process. In this process, the polymer solution is extruded through an orifice and conveyed through an air gap before entering a coagulation bath. The "dry" stage corresponds to the air gap, during which a portion of the solvent and nonsolvent components evaporates, thereby inducing nascent surface coagulation of the extrudate. The "wet" stage corresponds to immersion of the fiber in the coagulation bath, wherein phase separation and solidification occur to produce a hollow fiber structure.

The spinneret design includes a bore fluid injection system that is essential for forming the hollow (microcapillary) configuration and controlling the internal diameter of the fiber. The composition of the spinning solution, together with the parameters of the dry-wet spinning process, and bore injection fluid composition, collectively determine the porous morphology and gas separation characteristics of the resulting fibers.

It has been unexpectedly discovered that polyetherimide hollow fibers fabricated from spinning solutions containing specific combinations of solvents and non-solvents and processed under controlled dry-wet spinning conditions-including defined air gap distances and regulated gas pressure within the air gap-exhibit substantially improved gas separation performance compared to fibers produced from known formulations under conventional spinning conditions.

The hollow fiber membranes produced in accordance with the method of the present invention exhibit high $CO_2/CH_4$ gas separation factors in combination with commercially desirable $CO_2$ gas permeance. The membranes further demonstrate stable gas separation performance and maintain their high selectivity even when exposed to feed gas with a high carbon dioxide partial pressure. The membranes exhibit high gas separation factors for the removal of helium, hydrogen, and oxygen from gas mixtures containing these gases as well.

The hollow fibers of this invention exhibit a highly asymmetric, graded pore wall morphology. The asymmetric hollow fiber is a micro-capillary membrane with a selective surface skin layer supported by a porous substructure with a significantly larger pore size and pore volume as compared to the skin layer. The hollow fibers exhibit an outer diameter that is typically 100-800 μm, and an inner diameter (lumen) that is typically 50-400 μm, with a wall thickness: 25-200 μm. The hollow fiber membranes exhibit ultra-thin skin surface layers (~30-200 nm thick), desirable for high flux. In the high differential pressure separation applications, the skin is advantageously located on the exterior surface of the hollow fiber. This asymmetric hollow fiber is self-supporting and exhibits cylindrical geometry suitable for high surface-area modules.

The hollow fibers are extruded from polymer solutions comprised of solvent-non-solvent systems with polymer solution concentrations ranging from 25 to 45 weight percent. The polyetherimide (PEI) or a blend of polyetherimide with a compatible polyimide is dissolved in a mixture of an aprotic solvent and glycol ether non-solvent.

The preferred aprotic solvents are N-methylpyrrolidone, dimethylacetamide, dimethylformamide, dimethyl sulfoxide or a mixture thereof.

The glycol ether non-solvent is of the following general structure R—O—$CH_2$—$CH_2$—OH, wherein R is an alkyl or aryl group, with preferred non-solvents selected from glycol monoethyl ether, ethylene glycol monomethyl ether, ethylene glycol monopropyl ether, 2-butoxyethanol, 2-(hexyloxy) ethanol, or a mixture thereof. This group of glycol ether solvents is miscible with both water and organic solvents, with common examples including 2-butoxyethanol (Butyl Cellosolve™) and 2-ethoxyethanol (Ethyl Cellosolve™).

The spinning solution composition can further contain a surfactant or an inorganic salt. It is known to use surfactants (or surface-active agents) as additives in hollow fiber membrane spinning dopes to control phase inversion behavior, pore morphology, defect suppression, and interfacial stability between polymer and nonsolvent. The most common surfactants include Triton X-100 (octylphenol ethoxylate), TERGITOL™ 15-S-9 (Secondary Alcohol Ethoxylate), Tween 20/Tween 80 (polyoxyethylene sorbitan esters), Pluronic F127/F68 (PEO-PPO-PEO block copolymers), and Sodium Dodecyl Sulfate (SDS).

It is also within the scope of the invention to add organic solvent-soluble salts to spin dope formulations to modify thermodynamics and kinetics of the phase inversion process. These salts help tailor the skin layer density, porosity, and selectivity of the final membrane. Adding low concentrations (typically 0.5-5 wt %) of organic-soluble salts is used to adjust the solvent-nonsolvent exchange rate, influencing skin formation; suppress macrovoids and promote sponge-like morphologies; modify polymer chain packing or charge distribution in polar polymers like polyetherimides; and fine-tune permeability-selectivity trade-offs by altering free volume. The common salts include Lithium chloride (LiCl), Magnesium perchlorate ($Mg(ClO_4)_2$), Tetrabutylammonium bromide (TBAB), and Calcium chloride ($CaCl_2$)).

The composition of the spinning solution is formulated close to the coagulation point. The coagulation point is the critical condition at which a polymer solution begins to solidify through phase separation upon contact with a non-solvent, marking the transition from a liquid to a solid membrane structure.

In hollow fiber spinning, the coagulation point is reached in the coagulation column (external surface solidification) and inside the lumen (internal surface solidification), depending on the bore fluid composition and spinning conditions. Controlling where and when the coagulation point occurs determines: Skin layer formation (selective layer), substructure porosity, and the mechanical integrity of the fiber.

The polymer solution is extruded at temperatures ranging from 30 to 120 degrees centigrade, preferably from 50 to 90 degrees centigrade, into an air gap. The air gap can be as short as 0.5 cm to as long as 30 cm; preferably, the air gap is from 3 to 15 cm long.

In a preferred embodiment, the air gap is maintained at a sub-atmospheric pressure as disclosed in U.S. Pat. No. 5,181,940, incorporated herein by reference. The spinning dope is extruded through a tube-in-orifice spinneret into a gas-filled chamber maintained at reduced pressure and then the extruded hollow fiber is conveyed through a liquid bath to solidify the extrudate. In a preferred embodiment, the air gap is maintained at sub-atmospheric pressure, as disclosed in U.S. Pat. No. 5,181,940, which is incorporated herein by reference.

The spinneret is completely enclosed within a vacuum chamber, where the vacuum level is maintained between 15.0 to 54.0, and preferably between 20.0 and 47.0 cm Hg. The hollow filament stream passes through the vacuum chamber over a predetermined distance before entering the top of a coagulation column, followed by a quench bath. The coagulation column contains a fluid composed of water with variable amounts of solvent and non-solvent, while the quench bath consists essentially of water.

The coagulation bath temperature is a critical parameter in hollow fiber membrane spinning—it controls phase inversion kinetics, pore formation, and final morphology, and can range from 10 to 70 degrees centigrade, more commonly from 30 to 45 degrees centigrade.

The bore fluid may comprise nitrogen gas, water, or a mixture of water and solvent(s) to control the lumen pore size and the pore morphology of the adjacent inner wall.

The hollow fibers are washed extensively to remove residual solvent, non-solvents, and additives. The washing fluids can include water, alcohol, such as isopropyl alcohol, or a mixture thereof.

Following the washing step, the hollow fibers can be dried before use, wherein the drying step can be carried out directly from water or from alcohol or hydrocarbon solvent, following solvent exchange from water.

It is within the scope of the invention to apply a coating or a treatment to the asymmetric hollow fiber. The coating can be used to "caulk" residual defects or augment the gas separation characteristics of the hollow fiber.

Suitable coating materials include rubbery or glassy polymers that enhance the surface integrity and gas separation performance of the hollow fiber membrane. Exemplary coating materials include silicone-based polymers, poly (dimethylsiloxane) (PDMS), polyurethane, and other elastomeric or crosslinkable polymers capable of forming ultra-thin, defect-sealing layers or glassy polymers such as cellulose acetate, ethyl cellulose, or sulfonated polyphenylene oxide. The coating may be applied from dilute polymeric solutions using techniques such as dip coating, followed by solvent evaporation to form a uniform coating layer.

The gas separation performance can be further stabilized and/or augmented by an annealing step. The annealing step may be carried out under controlled temperature conditions sufficient to relax residual stress within the polymer matrix, improve interchain packing, and enhance the overall mechanical and separation stability of the membrane. Annealing is typically conducted at a temperature below the glass transition temperature (Tg) of the polymer for a period sufficient to achieve the desired thermal conditioning without inducing deformation or pore collapse of the hollow fiber structure. For polyetherimide hollow fiber membranes, the thermal treatment to stabilize performance can be carried out for an hour in a nitrogen atmosphere at an annealing temperature below 200° C., preferably between 17° and 180° C.

The hollow fiber membranes are assembled into gas separation cartridges/modules by methods known in the art and used for gas separation applications such as acid gas removal from natural gas and biogas, and helium recovery from natural gas, hydrogen recovery and purification from syngas and refinery gases, and nitrogen generation from air.

The membranes remove a more permeable gas component from a gas mixture of this component with at least one more component in the gas mixture by selective permeation through the hollow fiber membrane.

Membrane gas permeance of a component in the gas mixture is defined as the material flow of the component per unit of time, unit of membrane area, and differential pressure through a membrane. The term membrane selectivity, as used and claimed in the present invention to characterize membranes, in each case, is the pure gas selectivity, independent of whether membranes are used to separate a two-component or a multi-component gas mixture. The selectivity for hollow fiber membranes is calculated as a quotient of the permeances of two pure gases and is an indication of how well the membrane can separate a gas mixture with regard to the two components.

Membrane permeate refers to the gas stream obtained on the low-pressure side of the membrane, membrane module, or membrane separation step. Permeate gas refers in each case to gas generated by permeation through a polymeric membrane with gas component(s) enriched in the permeate stream relative to the respective feed stream at the membrane, at the membrane module, or in the membrane separation step. Retentate refers to the entire stream that is obtained on the high-pressure side of the membrane, membrane modules, or membrane separation step that does not pass through the membrane. Retentate gas refers to the component(s) enriched in each case in the retentate stream relative to the respective feed stream at the membrane, at the membrane module, or in the membrane separation step.

The stage cut (θ) is defined as:

$$\theta = \frac{Q_p}{Q_f}$$

where: $Q_p$=permeate flow rate (amount of gas that passes through the membrane); $Q_f$=feed flow rate (total gas entering the membrane module). The stage cut represents the fraction of the feed gas that permeates through the membrane. All gas separation membrane performance measurements were carried out at a low stage cut (e.g., <0.05), wherein only a small portion of the feed passes through the membrane, often used for high selectivity and product purity.

Example 1

A spinning solution was prepared by mixing 33.25 parts of a polyetherimide resin (Ultem™ 1000), 1.75 parts of phenylindane containing polyimide (Matrimid™ 5218), 3.25 parts of Triton (R) X100, 16.25 parts of ethyl cellosolve, and 45.50 parts of N-methyl pyrrolidone. The solution was subsequently deaerated, filtered, and pumped through a tube-in-orifice spinneret having an orifice diameter of 1.016 mm and an injection tube outside diameter of 0.406 mm at a rate of 10.5 cc/min and at a temperature of 72° C. A stream of N-methyl pyrrolidone/water 85/15 W/W mixture was delivered to the core of the injection tube. The spinneret was completely enclosed in a vacuum chamber in which the vacuum level was maintained at 46.5 cm Hg. The hollow filament stream traveled through the vacuum chamber for a distance of 12.5 cm, whereupon it entered the top of a coagulation column that consisted substantially of a solution of 0.5% N-methyl pyrrolidone in water, and was then drawn at 88.4 m/min through a quench bath consisting essentially of a 0.05% aqueous solution of N-methyl pyrrolidone maintained at 25° C. The resulting hollow fibers had an outside diameter of 0.42 mm and an inside diameter of 0.18 mm. The fibers were washed with an 80/20 W/W mixture of isopropanol/water to remove residual solvent and nonsolvent components and dried.

Example 2

Composite membranes were prepared by coating hollow fibers prepared as described in Example 1 with a 0.4% solution of a polydimethylsiloxane polymer (Sylgard™ 184) admixed with 10% of crosslinking catalyst, manufactured by Dow Chemical Co., in isooctane. The residual isooctane was removed by drying, and the thusly formed composite membrane was fabricated into modules containing 8 hollow fibers about 40.5 cm long. These membrane modules were tested for air separation characteristics at a pressure of 7.0 kg/cm$^2$ at 25° C. and close to zero percent stage cut. The composite membrane exhibited an oxygen permeation rate, $O_2$ P/t of 5.3×10$^{-6}$ cm$^3$/cm$^2$·cmHg·sec and an $O_2/N_2$ separation factor of 8.0.

Example 3

Hollow fibers were prepared in accordance with the techniques described in Example 1 using a blend of Ultem™ and Matrimid™ in a 95:5 ratio. A composite membrane was then prepared by solution coating the hollow fibers with ethyl cellulose. A solution of 0.2% solids in ethanol was applied to the hollow fibers at a coating rate of about 19.8 m/min. Thusly formed composite membranes were fabricated into a module containing 8 hollow fibers about 40.5 cm long. These modules were tested for helium and nitrogen permeation utilizing pure gases at a pressure of about 7.0 kg/cm$^2$ and a temperature of 25° C. The composite membrane exhibited a helium permeation rate of 13.4×10$^{-5}$ cm$^3$/cm$^2$·cmHg·sec, and a helium/nitrogen separation factor of 160.

Example 4

Hollow fibers were prepared in accordance with the techniques described in Example 1 using a blend of Ultem™ and Matrimid™ in a 95:5 ratio. A composite membrane was then prepared by solution coating the hollow fibers with ethyl cellulose. A solution of 0.2% solids in ethanol was applied to the hollow fibers at a coating rate of about 19.8 m/min. Thusly formed composite membranes were fabricated into a module containing 8 hollow fibers about 40.5 cm long. These modules were tested for carbon dioxide and nitrogen permeation utilizing feed gas mixtures with a carbon dioxide partial pressure ranging from 3.5 to 28.0 kg/cm$^2$ and a temperature of 30° C. The composite membrane exhibited an increasing carbon dioxide permeation rate from 25.2 to $31.1\times10^{-6}$ $cm^3/cm^2\cdot cmHg\cdot sec$ with an increase in feed gas carbon dioxide partial pressure, and a constant carbon dioxide/nitrogen separation factor of about 28 through all feed gas compositions.

Example 5

Hollow fibers were prepared in accordance with the techniques described in Example 1 using a blend of Ultem™ and Matrimid™ in a 95:5 ratio. A composite membrane was then prepared by solution coating the hollow fibers with ethyl cellulose. A solution of 0.2% solids in ethanol was applied to the hollow fibers at a coating rate of about 19.8 m/min. Thusly formed composite membranes were fabricated into a module containing 8 hollow fibers about 40.5 cm long. These modules were tested for carbon dioxide and nitrogen permeation utilizing feed gas mixtures with a carbon dioxide partial pressure ranging from 3.5 to 28.0 $kg/cm^2$ and a temperature of 45° C. The composite membrane exhibited a constant carbon dioxide permeation rate of $34.4\times10^{-6}$ $cm^3/cm^2\cdot cmHg\cdot sec$, and a constant carbon dioxide/nitrogen separation factor of 25.

Example 6

Hollow fibers were prepared in accordance with the techniques described in Example 1 using a blend of Ultem™ and Matrimid™ in a 95:5 ratio. A composite membrane was then prepared by solution coating the hollow fibers with ethyl cellulose. A solution of 0.2% solids was applied to the hollow fibers at a coating rate of about 19.8 m/min. Thusly formed composite membranes were fabricated into a module containing 8 hollow fibers about 40.5 cm long. These modules were tested for carbon dioxide and methane permeation utilizing feed gas mixtures with a carbon dioxide partial pressure ranging from 15.0 to 30.0 $kg/cm^2$ and a temperature of 45° C. The composite membrane exhibited a constant carbon dioxide permeation rate of $26.5\times10^{-6}$ $cm^3/cm^2\cdot cmHg\cdot sec$, and a constant carbon dioxide/methane separation factor of 32 throughout the range of feed gas compositions with incremental increase in carbon dioxide partial pressure.

The present invention is described in a number of embodiments, which should not be construed as limiting the present invention.

What is claimed is:

1. A hollow fiber comprising a polymer composition comprising a blend of polyetherimide (PEI) and a compatible polyimide, said hollow fiber produced by a method comprising the steps of:

(i) forming a spinning solution comprised of polyetherimide (PEI) or a blend of polyetherimide with a compatible polyimide in a mixture of an aprotic solvent and glycol ether non-solvent;

(ii) extruding said spinning solution through a spinneret to form a nascent hollow fiber while injecting a bore fluid;

(iii) passing the nascent hollow fiber through an air gap;

(iv) passing the nascent hollow fiber through a coagulation bath to solidify the hollow fiber;

(v) washing the hollow fiber to remove solvent and non-solvent, and (vi) collecting the solidified hollow fiber, wherein the polyimide is a condensation polymer of dianhydride and diamine of the following formulae:

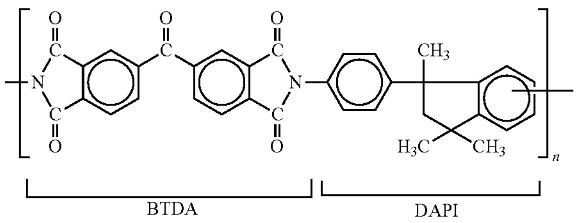

or a polyimide derived from aromatic dianhydrides and aromatic diisocyanates based on a 3,3'4,4'-benzophenone tetracarboxylic dianhydride and 80% methylphenylene-diamine+20% methylene diamine co-polyimide precursor (BTDA-TDI/MDI).

2. The hollow fiber of claim 1, wherein the aprotic solvent is N-methyl pyrrolidone, dimethylacetamide, dimethylformamide, or a mixture thereof.

3. The hollow fiber of claim 1, wherein the glycol ether is of the following general structure:

$$R—O—CH_2—CH_2—OH,$$

wherein R is an alkyl or aryl group.

4. The hollow fiber of claim 1, wherein the glycol ether comprises at least one of the following: glycol monoethyl ether, ethylene glycol monomethyl ether, ethylene glycol monopropyl ether, 2-butoxyethanol, 2-(hexyloxy) ethanol, and mixtures thereof.

5. The hollow fiber of claim 1, wherein the polyetherimide is benzene-1,3-diamine; 5-[4-[2-[4-[(1,3-dioxo-2-benzofuran-5-yl)oxy]phenyl]propan-2-yl]phenoxy]-2-benzofuran-1,3-dione of the following formulae:

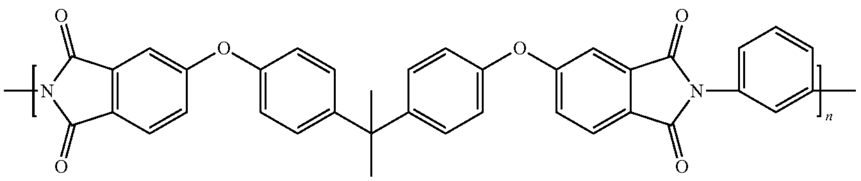

or sulfone group containing polyetherimide of the following formulae:

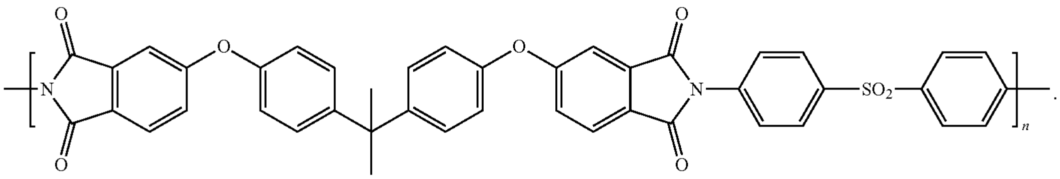

6. The hollow fiber of claim 1, wherein a polymer concentration in the solution ranges from 25 to 45 weight percent.

7. The hollow fiber of claim 6, wherein a weight ratio of polyetherimide to the compatible polyimide is 5:1 or higher.

8. The hollow fiber of claim 7, wherein the weight ratio of polyetherimide to the compatible polyimide is 10:1 or higher.

9. The hollow fiber of claim 1, wherein the air gap is maintained at a sub-atmospheric pressure between 15.0 to 54.0 cm Hg.

10. The hollow fiber of claim 9, wherein the air gap is maintained at a sub-atmospheric pressure between 20.0 and 47.0 cm Hg.

11. The hollow fiber of claim 1, wherein the hollow fiber is a subject to an additional drying step (vii).

12. The hollow fiber of claim 11, wherein the drying step is carried out from an alcohol or hydrocarbon solvent.

13. The hollow fiber of claim 1, wherein a coating of a polymer is applied to a surface of the hollow fiber.

14. The hollow fiber of claim 13, wherein the polymer is applied from a solution.

15. The hollow fiber of claim 14, wherein the polymer is a rubbery or glassy polymer that enhances a surface integrity and gas separation performance of the hollow fiber.

16. The hollow fiber of claim 15, wherein the rubbery polymer is a silicone-based polymer, poly(dimethylsiloxane), a polyurethane, or an elastomeric crosslinkable polymer.

17. The hollow fiber of claim 15, wherein the glassy polymer is a cellulose acetate, ethyl cellulose, or sulfonated polyphenylene oxide.

18. The hollow fiber of claim 13, wherein the coated hollow fiber is annealed at a temperature below a glass transition temperature of the polyetherimide.

19. The hollow fiber of claim 1, wherein the spinning solution contains an additive.

20. The hollow fiber of claim 19, wherein the additive is a surfactant, a salt, or a mixture thereof.

21. The hollow fiber of claim 1, wherein said hollow fiber has an asymmetric pore structure.

22. A gas separation membrane comprising the hollow fiber of claim 1.

* * * * *